US012387712B2

(12) United States Patent
Dorea et al.

(10) Patent No.: US 12,387,712 B2
(45) Date of Patent: Aug. 12, 2025

(54) CHARACTERIZATION VIA HOMOLOGIZING DISPARATE SPEECH TERMINOLOGY

(71) Applicant: Wisconsin Alumni Research Foundation, Madison, WI (US)

(72) Inventors: Joao Reboucas Dorea, Waunakee, WI (US); Rafael Ferreira, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 295 days.

(21) Appl. No.: 17/925,774

(22) PCT Filed: Jul. 28, 2021

(86) PCT No.: PCT/US2021/043455
§ 371 (c)(1),
(2) Date: Nov. 16, 2022

(87) PCT Pub. No.: WO2022/026547
PCT Pub. Date: Feb. 3, 2022

(65) Prior Publication Data
US 2023/0178070 A1 Jun. 8, 2023

Related U.S. Application Data

(60) Provisional application No. 63/057,472, filed on Jul. 28, 2020.

(51) Int. Cl.
*G10L 15/00* (2013.01)
*G10L 15/26* (2006.01)
(52) U.S. Cl.
CPC ............ *G10L 15/005* (2013.01); *G10L 15/26* (2013.01)

(58) Field of Classification Search
USPC .............. 704/235, 246, 247, 251, 252, 275
See application file for complete search history.

(56) References Cited

U.S. PATENT DOCUMENTS

| 11,080,882 B2* | 8/2021 | Yajima | A01K 29/00 |
| 2019/0250882 A1* | 8/2019 | Swansey | G06F 3/167 |
| 2022/0199096 A1* | 6/2022 | Iwase | G10L 17/24 |

FOREIGN PATENT DOCUMENTS

WO 2022026547 A1 2/2022

OTHER PUBLICATIONS

ISA/US, PCT/US2021/043455, PCT Search Report and Written Opinion mailed Oct. 5, 2021, Sandrine Lafitte-De Jong (22 pgs).
(Continued)

*Primary Examiner* — Leonard Saint-Cyr
(74) *Attorney, Agent, or Firm* — Crawford Maunu PLLC (57) ABSTRACT

Aspects of the present disclosure are directed to methods and apparatuses involving characterization via homologizing disparate speech terminology. As may be implemented in accordance with one or more embodiments, audio processing circuitry is utilized to identify a respective language used for audio data sets. Homologizing circuitry is operable to homologize terms in the audio data sets for characterizing animals to which respective ones of the audio data sets are linked, by assessing and assigning terms in the respective audio data sets to respective homologized meanings based on the identified language for the audio data sets and an association between terms in the identified language for each audio data, set and the homologized meaning. The homologized meanings may be in association with one of the animals to which the audio data set is linked, therein facilitating common characterizations of the animals utilizing disparate languages and terms.

19 Claims, 4 Drawing Sheets

(56) References Cited

OTHER PUBLICATIONS

Anonymous, "Audio mining", https://en.wikipedia.ord/w/indez.pho?title=audio_mining$oldid=956152651, May 11, 2020 (7 pages).

* cited by examiner

FIG. 4

CHARACTERIZATION VIA HOMOLOGIZING DISPARATE SPEECH TERMINOLOGY

BACKGROUND

For many applications, it is desirable to track monitored characteristics, such as with livestock, patients, equipment and more. Doing so may involve manual observation and monitoring, recording data therefrom, and storing that data in connection with a subject of such monitoring. Such approaches may be useful for a variety of reasons, such as for monitoring livestock or personal health, monitoring equipment health, creating a database for ascertaining trends or social conditions, and more.

While monitoring in this regard has been useful, gathering data in an efficient and easy to use manner can be challenging. Further, gathering widespread data from disparate sources, for the same or different groups of monitored subjects, can be particularly challenging to achieve with accuracy. For instance, data collection and standardization can be challenging to carry out in a manner that allows efficient analysis of data. These and other matters have presented challenges to characterizing subjects such as livestock via monitored characteristics, particularly in an efficient manner and with disparate uses, for a variety of applications.

SUMMARY

Various example embodiments are directed to apparatuses and methods involving homologizing audio data, such as various forms of speech dialect, terms and/or languages, to common characterizations of animals. Such embodiments may be useful for automatically characterizing animal health, well-being or other conditions via speech detection and processing, independently from variables used in terminology, language, and dialect pertaining to the characterization.

As may be implemented in accordance with one or more embodiments, an apparatus comprises audio processing circuitry that is configured and arranged to identify a respective language used for each of a plurality of audio data sets. The apparatus further includes homologizing circuitry configured and arranged with the audio processing circuitry to homologize terms in the audio data sets for characterizing a plurality of animals to which respective ones of the audio data sets are linked, by assessing and assigning terms in the respective audio data sets to respective homologized meanings based on the identified language for the respective audio data sets and a predefined association between terms in the identified language for each audio data set and the homologized meaning. The homologizing circuitry is also configured and arranged with the audio processing to, for each of the audio data sets, store the homologized meaning in association with one of the plurality of animals to which the audio data set is linked, and therein facilitate common characterizations of the plurality of animals utilizing disparate languages and terms.

Various embodiments are directed to method-based approaches, including those as may be carried out in connection with apparatuses and their function as characterized herein. In accordance with a particular embodiment, method is carried out as follows. Audio processing circuitry is used to identify a respective language used for each of a plurality of audio data sets. Homologizing circuitry is used with the audio processing circuitry to homologize terms in the audio data sets for characterizing a plurality of animals to which respective ones of the audio data sets are linked. This homologizing is carried out by assessing and assigning terms in the respective audio data sets to respective homologized meanings based on the identified language for the respective audio data sets and a predefined association between terms in the identified language for each audio data set and the homologized meaning. For each of the audio data sets, the homologized meaning is stored in association with one of the plurality of animals to which the audio data set is linked, therein facilitating common characterizations of the plurality of animals utilizing disparate languages and terms.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings, in which.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

DETAILED DESCRIPTION

Aspects of the present disclosure are believed to be applicable to a variety of different types of articles of manufacture, apparatuses, systems and methods involving the characterization and association/homologizing of sets of audio data, which include disparate terms, with a common meaning. In certain implementations, aspects of the present disclosure have been shown to be beneficial when used in the context of characterizing agricultural concerns, such as livestock, in a manner that allows the use of a multitude of disparate languages, terminology such as shorthand and/or alternate versions of an intended meaning, dialect and more for audible characterization. For instance, such approaches may be utilized to process speech data to populate structured databases and standardize data collection and related analyses in agricultural systems. While not necessarily so limited, various aspects may be appreciated through a discussion of examples using such exemplary contexts.

Various example embodiments are directed to categorizing data into fields that can be customized depending on the database. For instance, a core set of fields may be utilized across two or more databases, with other fields in each database being customized. As another example, such a core set of fields may pertain to data stored in disparate databases that pertains to a common subject, such as a common animal.

Standardized, edited, and harmonized/homologized datasets are created to facilitate data analyses across multiple disparate systems, in accordance with various aspects of the disclosure herein. Certain applications are directed to agricultural systems, in which data integration and standardization is carried out to provide datasets amenable to use with advanced analytical tools. For example, in a dairy farm, when one cow exhibits a condition such as "Mastitis", the condition may be identified using a variety of disparate terms, such as "Mastitis", "Mast", "MST", "BacMast", and "Masti". Such terms, when provided via speech recognition, may also be provided using different languages and dialects. Accordingly, datasets including such terminology are homologized in accordance with one or more embodiments herein. This terminology may be captured via speech recognition or otherwise, with embodiments involving the former including an apparatus and related method driven by real-time voice commands from a user (e.g., a farm employee). This approach facilitates the collection of data when the problem is identified, for instance as such a user initially views an animal exhibiting an illness. Collected audio speech data may be sent to a circuit device such as a computer, smartphone, sensor, or other device, and used to populate a particular database in real-time.

In a particular embodiment, speech data (audio) is collected for an agricultural system, may be translated if desired, converted into text data, and used to automatically populate a database related to a particular theme (e.g., animal nutrition, animal reproduction, or animal health). Results may be displayed in real-time, such as via graphs or other visual data presentation. This may be facilitated via homologizing circuitry, acting as a standardization tool to screen for disparate possible terms related to a standard term. Using an example noted above, the term Mastitis may be mapped to the terms Mast, MST, BacMast, and Masti, and may be further mapped to these terms as presented in various languages and/or dialects.

In certain embodiments, these terms provide a resulting homologized meaning, various ones of which are linked, grouped or otherwise used together to characterize a theme. For example, homologized meanings "mastitis," "ketosis," "lameness," and "acidosis" may be linked into a health records database. Homologized meanings such as "pregnant" and "not pregnant" may be linked into a reproduction database.

An application programming interface (API) or other interface may be utilized via management software to automatically populate databases, such as to provide analysis within a particular environment or across a multitude of environments. For instance, animal characteristics monitored in respective environments may be compared to one another and such comparisons may be utilized to assess environmental impact upon subjects. In this context, certain characteristics such as those relating to particular disease can be tracked in completely disparate environments, using homologizing as characterized herein to provide common meanings for characteristics. These characteristics may then be tracked according to a type of environment involved. This approach may, for example, be utilized to track a certain disease relative to the environmental conditions in the presence (or absence) of the disease. In the context of agriculture, livestock housing conditions that affect such disease conditions may be identified. In the context of medical care, diseases and/or conditions indicative of such diseases may be identified and characterized relative to the environment in which the diseases and/or conditions are identified.

In a more particular embodiment, an apparatus comprises audio processing circuitry and homologizing circuitry. The audio processing circuitry identifies a respective language used for audio data sets, and the homologizing circuitry operates with the audio processing circuitry to homologize terms in the audio data sets for characterizing animals to which respective ones of the audio data sets are linked. Terms in the respective audio data sets may be assessed and assigned to respective homologized meanings, which may be based (in part) on the identified language for the respective audio data sets and a predefined association between terms in the identified language for each audio data set and the homologized meaning. For instance, audio data sets may be converted to text and terms in the text may be assessed and assigned to homologized terms, which may for example include respective terms that characterize the health of one of the plurality of animals. The homologized meaning (or meanings) for each audio data set is stored in association with an animal to which the audio data set is linked. For instance, a database including records for each of the plurality of animals may be populated in which each record has ones of the homologized terms stored therein. The homologizing circuitry may associate respective ones of the homologized meanings with disparate types of animals, and assess and assign the terms in the respective audio data sets based on the type of animal to Which the audio data set pertains. Accordingly, common characterizations of various animals may be made utilizing disparate terminology and, where applicable, language that may be disparate. In this context, the audio processing circuitry may identify a respective language by effectively identifying disparate terminology (as language) that may be in a common spoken language (e.g., English).

In certain embodiments, various terms are associated with a standard term/homologized meaning and stored in association therewith. For instance, homologizing circuitry may generate an association between a plurality of terms in respective languages and the homologized meanings by collecting a dataset including disparate terms used to characterize an animal, assessing the dataset (for each homologized meaning) for disparate terms related to the homologized meaning. Data indicating an association between the disparate terms and the homologized meanings is then stored.

In some instances, a standard/homologized term is defined based on a target health record database's use of fields. For instance, homologizing circuitry may define respective homologized meanings based on a target database having records for each of several animals and fields in each record to which the homologized meanings apply. This may involve, for example, storing meanings relevant for certain animal types in a particular database, or on information to be provided by such a database.

Fields may be customized for different types of databases, such as by associating homologized meanings with disparate data fields in different types of databases. This may facilitate population of different types of data fields with a common set of homologized meanings. The homologized meanings are respectively stored in association with the one of the animals, in one of the databases to which the one animals is assigned and using one of the data fields associated with the homologized meaning.

The audio processing circuitry may be implemented in a variety of manners. For instance, the respective language used for each of a plurality of audio data sets may be identified in response to a user input indicating a language to be used. The respective language used for each of a plurality of audio data sets may be identified by analyzing characteristics of the audio data sets and matching each respective audio data set with a respective language based on the analyzing. A microphone may be further utilized to capture the audio data sets, and communications circuitry configured and arranged to transmit the audio data sets for storage in a remote database.

In certain embodiments, communication circuitry is implemented to communicate with a plurality of remote devices that capture the audio data sets and that operate on behalf of disparate entities. The homologizing circuitry is configured to associate the respective audio data sets with a particular one of the disparate entities based on the communication received from the remote device, and to homologize the terms in each of the audio data sets based on the entity with which the audio data set is associated.

Various embodiments are directed to method-based approaches, including those as may be carried out in connection with apparatuses and their function as characterized herein. In accordance with a particular embodiment, method is carried out as follows. Audio processing circuitry is used to identify a respective language used for each of a plurality of audio data sets. Homologizing circuitry is used with the audio processing circuitry to homologize terms in the audio data sets for characterizing a plurality of animals to which respective ones of the audio data sets are linked. This homologizing is carried out by assessing and assigning terms in the respective audio data sets to respective homologized meanings based on the identified language for the respective audio data sets and a predefined association between terms in the identified language for each audio data set and the homologized meaning. For instance, the audio data sets may be converted to text and terms in the text may be assessed and assigned to homologized terms. For each of the audio data sets, the homologized meaning is stored in association with one of the plurality of animals to which the audio data set is linked, therein facilitating common characterizations of the plurality of animals utilizing disparate languages and terms. For instance, storing the homologized meaning may include populating a database, including records for each of the plurality of animals, with each record having ones of the homologized terms stored therein.

In some instances, the audio processing circuitry is used to identify the respective language used for each of a plurality of audio data sets by analyzing characteristics of the audio data sets and matching each respective audio data set with a respective language based on the analyzing. For instance, a particular language such as English or Spanish may be recognized. This recognition may further be used to identify terminology specific to the particular language that also pertains to a homologized meaning. As such, short hand terms, slang and other variations on language (and related sounds) may be linked to a homologize meaning.

In some implementations data indicating an association between a plurality of terms in respective languages and the homologized meanings is generated as follows. A dataset including disparate terms used to characterize an animal is collected. For each homologized meaning, the dataset is assessed for disparate terms related to the homologized meaning. Data indicating an association between the disparate terms and the homologized meanings may then be stored. In certain implementations, the respective homologized meanings are defined based on a target database having records for each of the plurality of animals and fields in each record to which the homologized meanings apply. Respective ones of the homologized meanings may be associated with disparate types of animals, and terms in the respective audio data sets are assessed and assigned based on the type of animal to which the audio data set pertains.

In another implementation certain ones of the homologized meanings are associated with disparate data fields in different types of databases, facilitating population of different types of data fields with a common set of homologized meanings. The homologized meaning is stored in one of the databases to which the one of the plurality of animals is assigned, using one of the data fields associated with the homologized meaning. For instance, respective databases may be tailored for a particular application and may have tailored homologized meanings in this regard that may differ between respective databases. In this sense, a particular term may be associated with different homologized meanings in different databases. Further, such meanings may correlate to a common meaning, yet may utilize different characteristics (e.g., different language, dialect and/or terminology).

Figure 1:
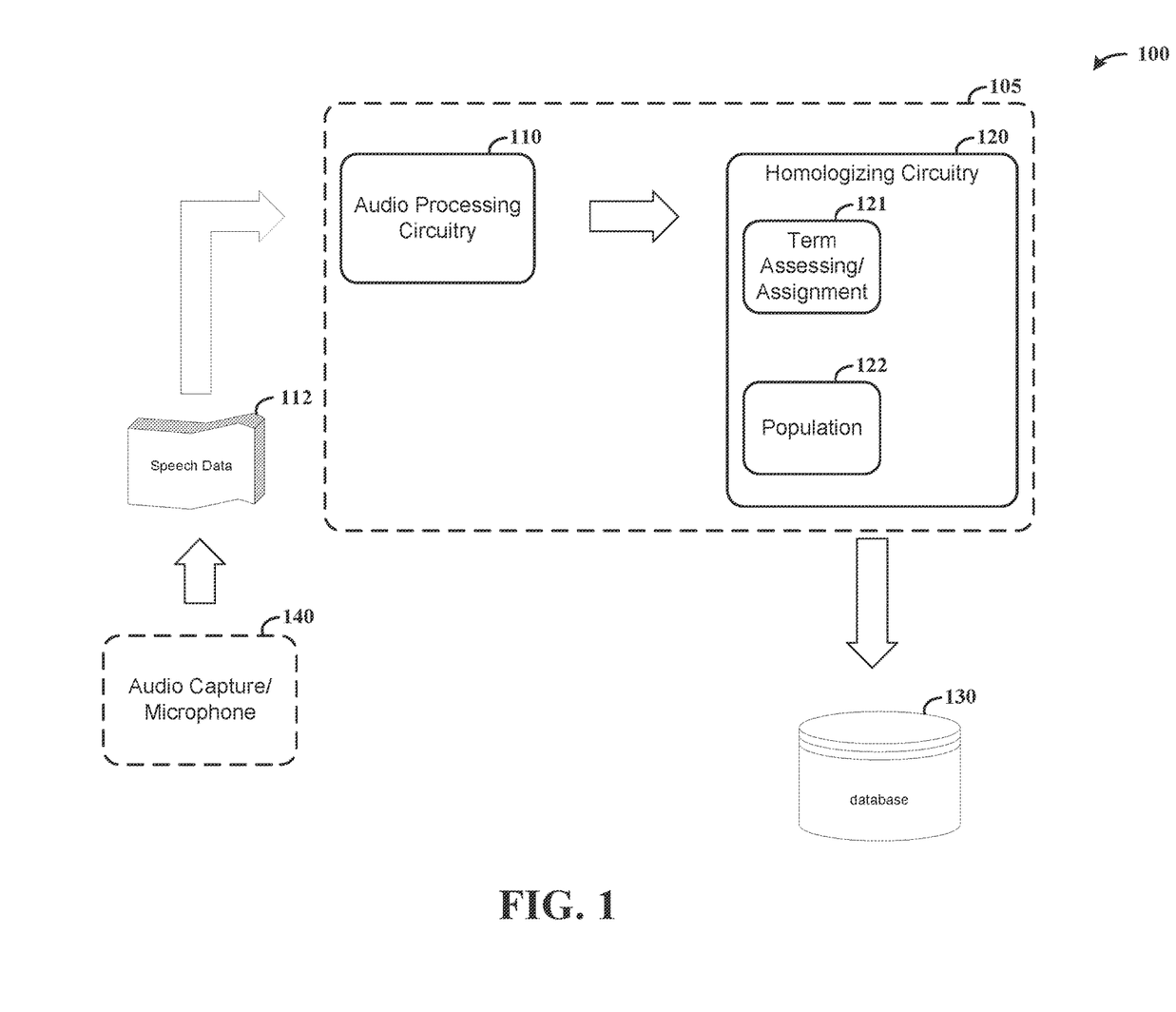
FIG. 1 shows an apparatus for homologizing audio, as may be implemented in accordance with one or more embodiments.

Turning now to the figures, FIG. 1 shows an apparatus 100 for homologizing audio, as may be implemented in accordance with one or more embodiments. The apparatus 100 includes audio processing circuitry 110 and homologizing circuitry 120. The audio processing circuitry 110 is configured to process received speech data 112, such as to convert the speech data to text characterizing audio data sets and, where desired, translate the data into a particular language. The apparatus 100 may utilize and/or include audio capture circuitry 140, such as may include a microphone, to capture the speech data 112. The homologizing circuitry 120 may convert, or homologize, terms in the speech data (e.g., audio data sets) by assessing recognized terms and assigning those terms to a meaning at circuit module 121. As consistent with various embodiments herein, such an approach may involve matching shorthand, slang, or other linguistic variations to a common meaning. This information can then be used at a population module 122 to populate a database 130. As a specific example, multiple meanings for a common term may be utilized for characterizing animals to which respective audio data sets are linked. The homologized meaning may be stored in association with one of the animals to which an audio data set is linked, therein facilitating common characterizations of the plurality of animals utilizing disparate languages and terms.

In some instances, the audio processing circuitry 110 and homologizing circuitry 120 are part of a common system 105. This system 105 may be implemented remotely from where speech data is collected. A multitude of databases 130 may be thus utilized to store data pertaining to a particular characterization, such as to a particular agricultural location (e.g., farm). Further, such databases may include information from multiple location for use in characterizing trends related to conditions, as noted herein and otherwise.

Figure 2:
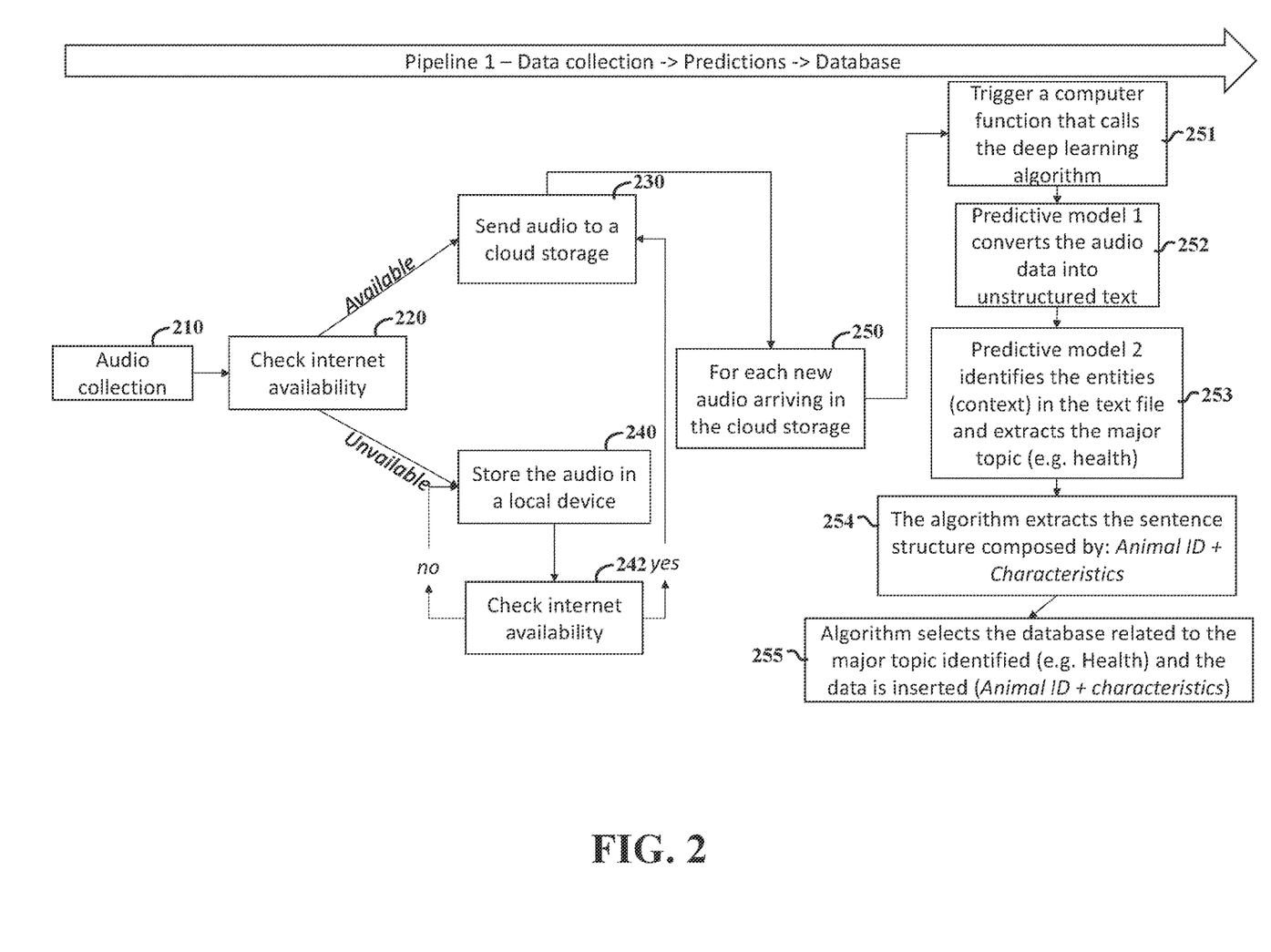
FIG. 2 is a data flow diagram for processing and homologizing audio data in a network approach, as may be implemented in accordance with one or more embodiments.

FIG. 2 is a data flow diagram for processing and homologizing audio data in a network approach, as may be implemented in accordance with one or more embodiments. At block 210, audio such as user input speech is collected. At block 220 network/internet availability is assessed and, in response to network/internet being available, collected audio is sent to cloud storage at block 230. This may involve, for example, collecting audio via an app running on a mobile device, and checking for network availability. If network/internet access is not available (e.g., on a remote farming operation), collected audio is stored locally at block 240 and network/internet availability is checked at block 242 (e.g., on a cyclic basis) until available, at which time the audio is sent to cloud storage at block 230.

Data received at cloud storage as noted at block 250 is then processed, triggering a computer function at block 251 that calls a deep learning algorithm for homologizing the data. Such an algorithm may, for example, process audio data including speech terms in an attempt to match those speech terms with an homologized term and, over time, associate variations in terminology (e.g., related to dialect or use) with an homologized term. At block 252, a predictive model converts received audio data into unstructured text. Another predictive model identifies entities in the text file and extracts a topic, such as animal health, to which the converted audio data applies at block 253. Using this extracted topic, an algorithm extracts sentence structure at block 254 as may be characterized as an animal identification and characteristics for that animal as depicted by example in the figure. At block 255, an algorithm selects a database related to the extracted topic, and inserts the data with the text linked or otherwise associated with a homologized term.

In various implementations, the data flow diagram of FIG. 2 is implemented with the apparatus shown in FIG. 1. For instance, aspects relating to block 252 may be carried out with the audio processing circuitry 110, and aspects relating to blocks 253-255 may be carried out with the homologizing circuitry 120.

Figure 3:
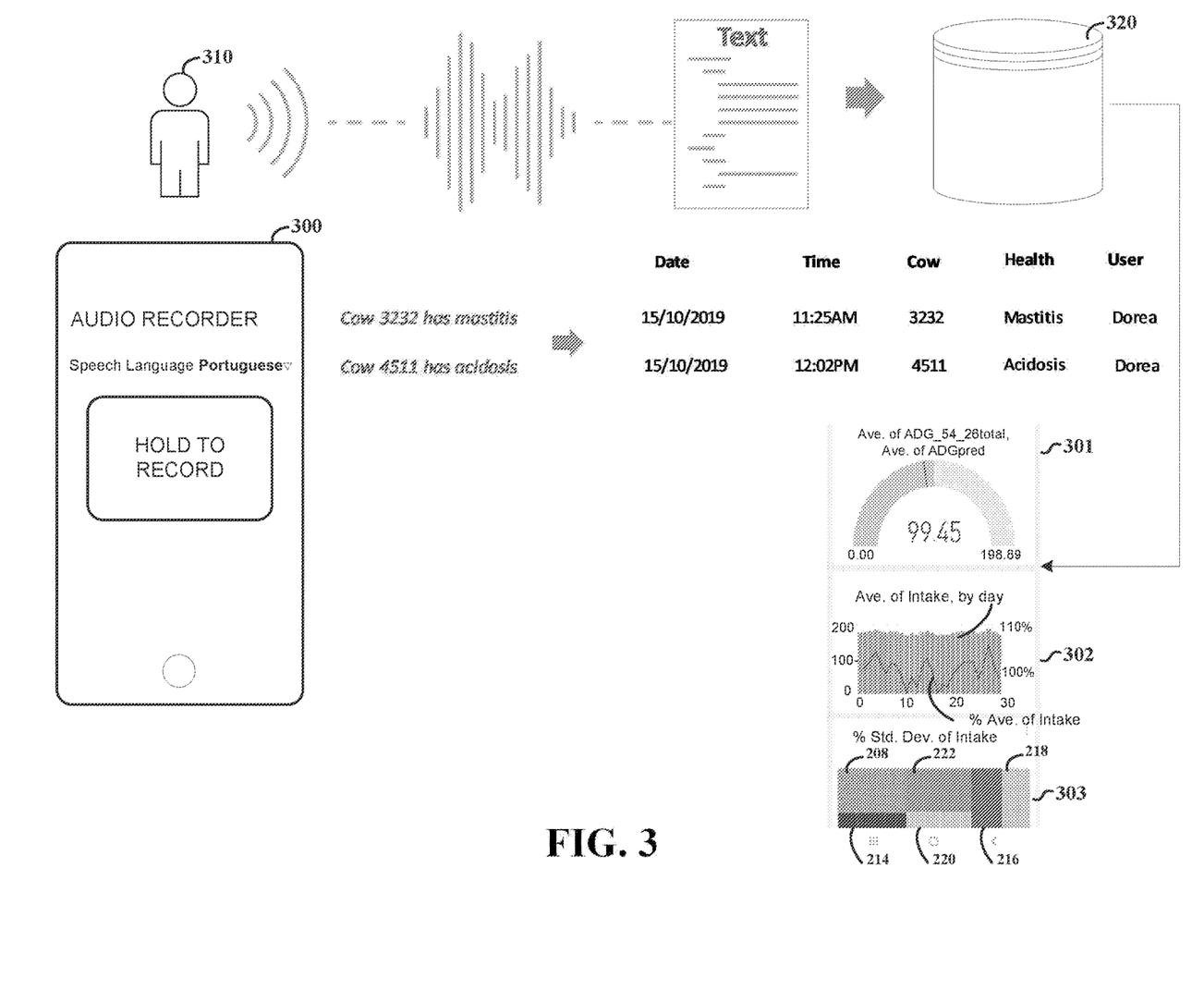
FIG. 3 shows a system and approach for processing and homologizing audio data, as may be implemented in accordance with one or more embodiments.

FIG. 3 shows a system and approach for processing and homologizing audio data, as may be implemented in accordance with one or more embodiments. An audio recording is obtained from a user 310 in one of a multitude of languages, for example utilizing an app running on a smart phone 300 shown set to Portuguese by way of example. The audio is processed to identify terms that are homologized to a standard type term applicable to all languages, and useful for characterizing livestock. This information may be stored in a database 320 and utilized to generate and output analytics concerning the livestock. For instance, example input shown is to indicate that Cow 3232 has mastitis, and Cow 4511 has acidosis. Related information including date, time, cow number, health issue as identified and user identifying the health issue may be generated and provided for storage in the database 320.

Information may be displayed, such as on smart phone 300, with a graphical interface as shown at 301. By way of example, a graph 302 shows average intake by day in bar form and % Ave. intake in line form as indicated, with graphic 303 indicating standard deviation of intake by unit 208, 214, 216, 218, 220 and 222.

Figure 4:
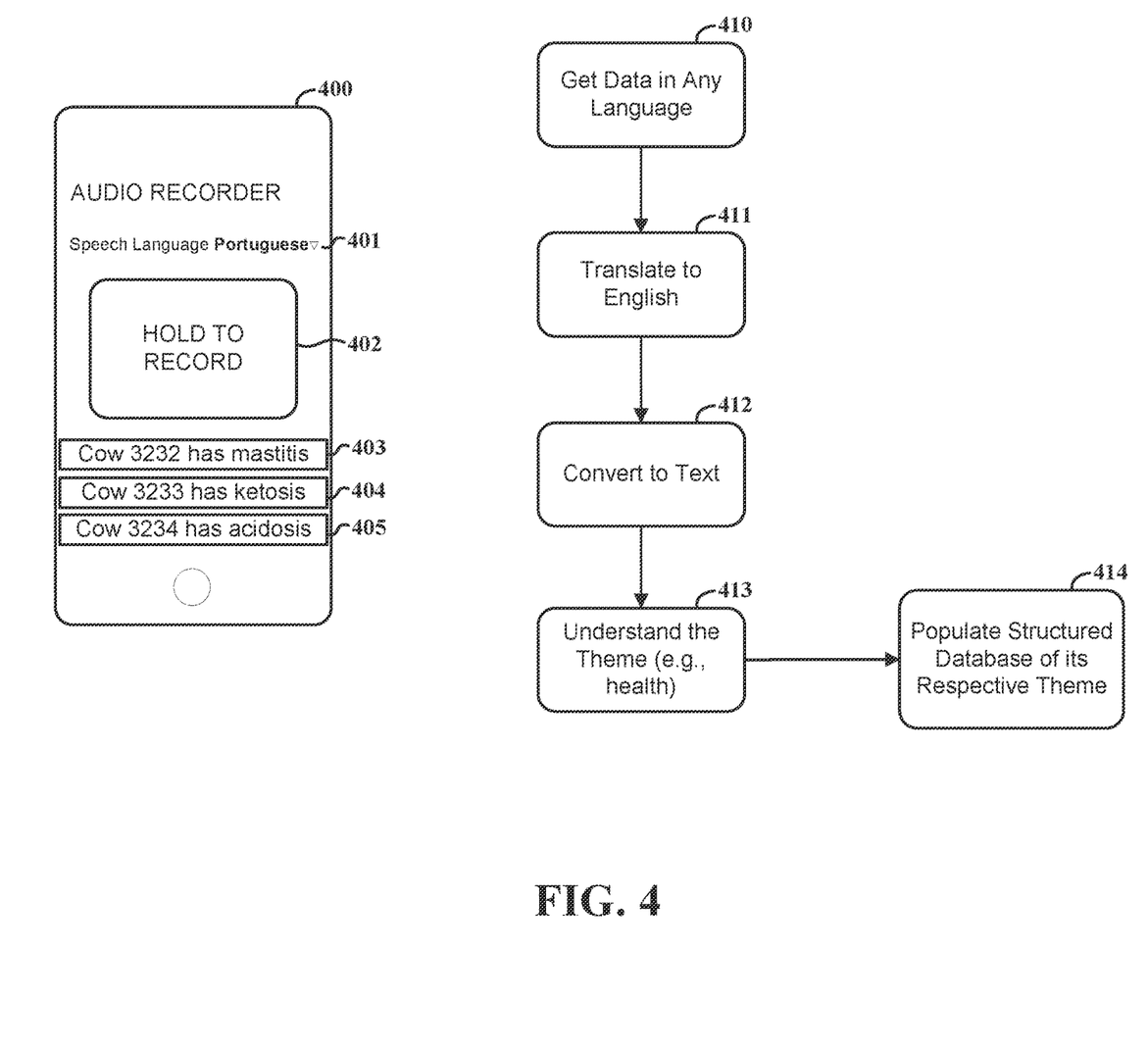
FIG. 4 shows an application-based approach to homologizing data and populating a structured database, as may be implemented in accordance with one or more embodiments.

FIG. 4 shows an application-based approach to homologizing data and populating a structured database, as may be implemented in accordance with one or more embodiments. An audio recorder application running on a smart phone 400 captures audio from a user in one of many languages, for instance in Portuguese as shown at 401. Speech can be recorded at block 410 using for example a graphical recording interface 402, and may record text such as shown at 403, 404 and 405. This data is depicted as being translated to English, by way of example, at block 411 and converted to text at block 412. The theme of the text is then ascertained at block 413, for example as health of an animal. Other themes, such as reproduction or as otherwise discussed herein, may be similarly utilized. A structured database for the particular theme, as relating to the particular animal, may then be populated at block 414.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., audio processing or homologizing). For example, in certain of the above-discussed embodiments, one or more modules are discrete logic circuits or programmable logic circuits configured and arranged for implementing these operations/activities, as in the circuit modules shown in the figures. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). Certain modules include a combination of a CPU hardware-based circuit and a set of instructions, where the first module includes a CPU hardware circuit with a set of instructions and the second module includes a CPU hardware circuit (possibly the same) with another set of instructions. Certain embodiments are also directed to a computer program product (e.g., nonvolatile memory device), which includes a machine or computer-readable medium having stored thereon instructions which may be executed by a computer (or other electronic device) to perform operations/activities as characterized herein.

Based upon the above discussion and illustrations, those skilled in the art will readily recognize that various modifications and changes may be made to the various embodiments without strictly following the exemplary embodiments and applications illustrated and described herein. For example, homologizing characterized as pertaining to animal characteristics may be used in a variety of other applications, such as those involving medical characterizations, mechanical characterizations, electrical characterizations, and more. Such modifications do not depart from the true spirit and scope of various aspects of the invention, including aspects set forth in the claims.

What is claimed is:

1. An apparatus comprising:
   audio processing circuitry configured and arranged to identify a respective language used for each of a plurality of audio data sets pertaining to collected audio from human speech; and
   homologizing circuitry configured and arranged with the audio processing circuitry to homologize terms in the audio data sets for characterizing a plurality of animals to which respective ones of the audio data sets are linked, by:
   assessing and assigning terms in the respective audio data sets to respective homologized meanings, which include respective terms that characterize the health of one of the plurality of animals, based on the identified language for the respective audio data sets and a predefined association between terms in the identified language for each audio data set and the homologized meaning; and
   for each of the audio data sets, storing the homologized meaning in association with one of the plurality of animals to which the audio data set is linked and associating the homologized meanings with two or more disparate terms in the audio data sets, including associating a single homologized term with the two or more disparate terms such that the identification of either of the two or more disparate terms involves associating the single homologized term with the one of the plurality of animals, therein facilitating common characterizations of the plurality of animals utilizing disparate languages and terms.

2. The apparatus of claim 1, wherein assessing and assigning terms in the identified language includes converting the audio data sets to text, and assessing and assigning terms in the text to homologized terms.

3. The apparatus of claim 2, wherein storing the homologized meaning in association with the one of the plurality of animals includes populating a database, including records for each of the plurality of animals, with each record having ones of the homologized terms stored therein.

4. The apparatus of claim 1, wherein the homologizing circuitry is configured and arranged to generate an association between a plurality of terms in respective languages and the homologized meanings by:
   collecting a dataset including disparate terms used to characterize an animal;
   for each homologized meaning, assessing the dataset for disparate terms related to the homologized meaning; and
   storing data indicating an association between the disparate terms and the homologized meanings.

5. The apparatus of claim 1, wherein the homologizing circuitry is configured and arranged to define the respective homologized meanings based on a target database having records for each of the plurality of animals and fields in each record to which the homologized meanings apply.

6. The apparatus of claim 1, wherein the homologizing circuitry is configured and arranged to associate respective ones of the homologized meanings with disparate types of animals, and to assess and assign the terms in the respective audio data sets based on the type of animal to which the audio data set pertains.

7. The apparatus of claim 1, wherein the audio processing circuitry is configured and arranged to identify the respective language used for each of a plurality of audio data sets in response to a user input indicating a language to be used.

8. The apparatus of claim 1, wherein the audio processing circuitry is configured and arranged to identify the respective language used for each of a plurality of audio data sets by analyzing characteristics of the audio data sets and matching each respective audio data set with a respective language based on the analyzing.

9. The apparatus of claim 1, further including a microphone configured and arranged to capture the audio data sets, and communications circuitry configured and arranged to transmit the audio data sets for storage in a remote database.

10. The apparatus of claim 1, further including communication circuitry configured and arranged to communicate with a plurality of remote devices that capture the audio data sets and that operate on behalf of disparate entities, wherein the homologizing circuitry is configured and arranged to associate the respective audio data sets with a particular one of the disparate entities based on the communication received from the remote device, and to homologize the terms in each of the audio data sets based on the entity with which the audio data set is associated.

11. An apparatus comprising:
   audio processing circuitry configured and arranged to identify a respective language used for each of a plurality of audio data sets pertaining to collected audio from human speech; and
   homologizing circuitry configured and arranged with the audio processing circuitry to homologize terms in the audio data sets for characterizing a plurality of animals to which respective ones of the audio data sets are linked, by:
      assessing and assigning terms in the respective audio data sets to respective homologized meanings based on the identified language for the respective audio data sets and a predefined association between terms in the identified language for each audio data set and the homologized meaning, including associating ones of the homologized meanings with disparate data fields in different types of databases, therein facilitating population of different types of data fields with a common set of homologized meanings; and
      for each of the audio data sets, storing the homologized meaning in association with the one of the plurality of animals to which the audio data set is linked, by storing the homologized meaning in one of the databases to which the one of the plurality of animals is assigned, using one of the data fields associated with the homologized meaning, therein facilitating common characterizations of the plurality of animals utilizing disparate languages and terms.

12. A method comprising:
   using audio processing circuitry to identify a respective language used for each of a plurality of audio data sets; and
   using homologizing circuitry with the audio processing circuitry to homologize terms in the audio data sets for characterizing a plurality of animals to which respective ones of the audio data sets are linked, by:
      assessing and assigning terms in the respective audio data sets to respective homologized meanings that include respective terms that characterize the health of one of the plurality of animals, based on the identified language for the respective audio data sets and a predefined association between terms in the identified language for each audio data set and the homologized meaning; and
      for each of the audio data sets, storing the homologized meanings in association with one of the plurality of animals to which the audio data set is linked, including associating the homologized meanings with two or more disparate terms in the audio data sets in which a single homologized term is associated with the two or more disparate terms such that the identification of either of the two or more disparate terms involves associating the single homologized term with the one of the plurality of animals therein facilitating common characterizations of the plurality of animals utilizing disparate languages and terms.

13. The method of claim 12, wherein assessing and assigning terms in the identified language includes converting the audio data sets to text, and assessing and assigning terms in the text to homologized terms.

14. The method of claim 12, wherein storing the homologized meaning in association with the one of the plurality of animals includes populating a database, including records for each of the plurality of animals, with each record having ones of the homologized terms stored therein.

15. The method of claim 12, further including generating, via the homologizing circuitry, data indicating an association between a plurality of terms in respective languages and the homologized meanings by:

collecting a dataset including disparate terms used to characterize an animal;

for each homologized meaning, assessing the dataset for disparate terms related to the homologized meaning; and storing data indicating an association between the disparate terms and the homologized meanings.

16. The method of claim 12, further including defining, via the homologizing circuitry, the respective homologized meanings based on a target database having records for each of the plurality of animals and fields in each record to which the homologized meanings apply.

17. The method of claim 12, further including utilizing the homologizing circuitry to:

associate ones of the homologized meanings with disparate data fields in different types of databases, therein facilitating population of different types of data fields with a common set of homologized meanings; and store the homologized meaning in association with the one of the plurality of animals by storing the homologized meaning in one of the databases to which the one of the plurality of animals is assigned, using one of the data fields associated with the homologized meaning.

18. The method of claim 12, further including utilizing the homologizing circuitry to associate respective ones of the homologized meanings with disparate types of animals, and to assess and assign the terms in the respective audio data sets based on the type of animal to which the audio data set pertains.

19. The method of claim 12, further including identifying, via the audio processing circuitry, the respective language used for each of a plurality of audio data sets by analyzing characteristics of the audio data sets and matching each respective audio data set with a respective language based on the analyzing.

* * * * *